Figure 1:
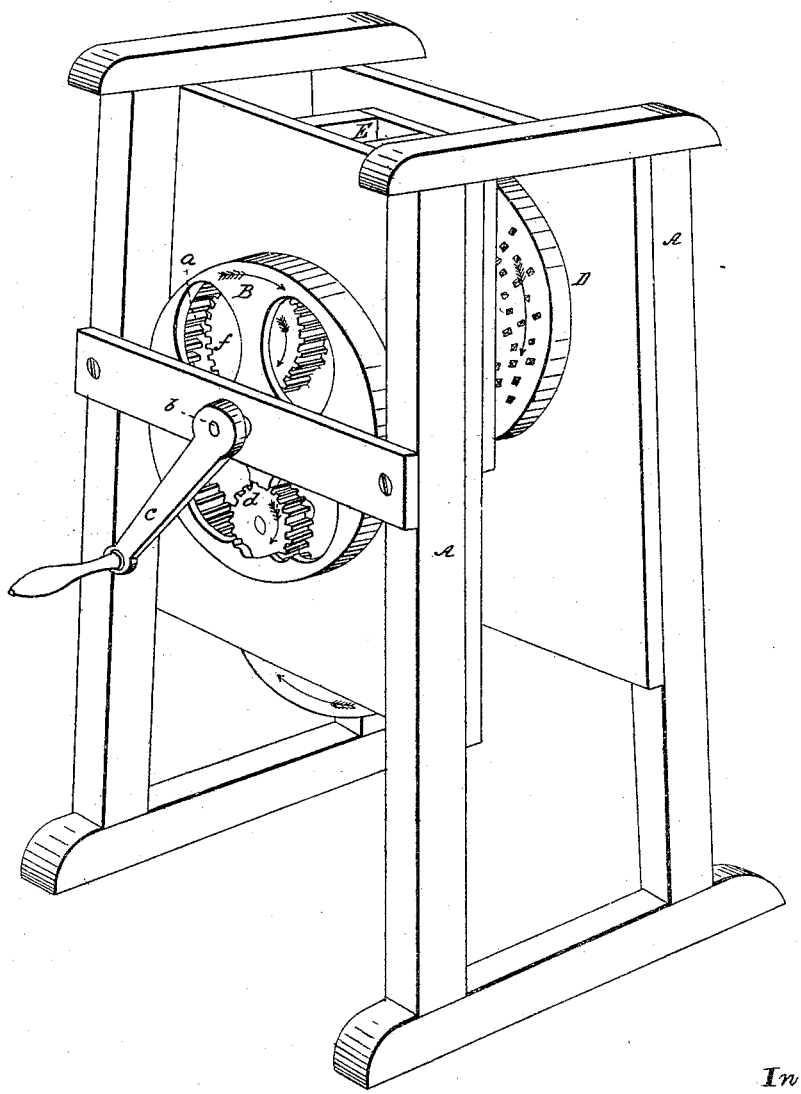
Figure 2:
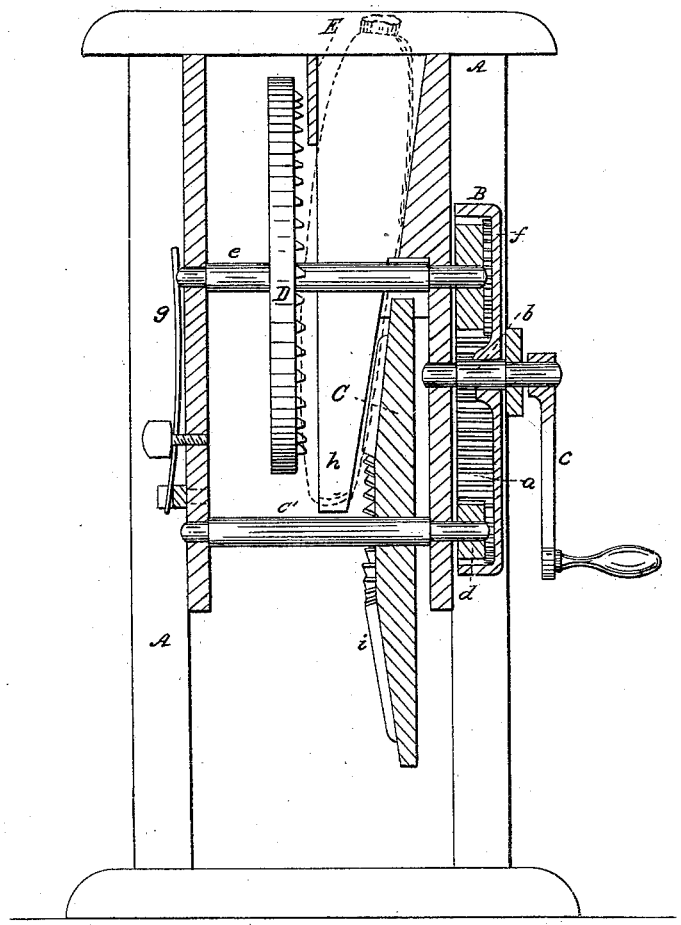
Figure 3:
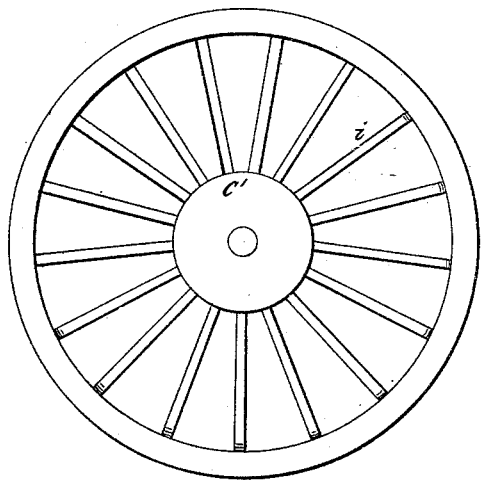
Figure 4:
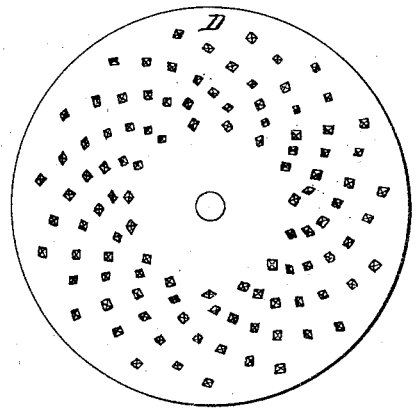

D. HUTCHINSON.
Corn Sheller.

No. 45,924.

3 Sheets—Sheet 1.

Patented Jan. 17, 1865.

Witnesses:

Inventor:
D. HUTCHINSON

D. HUTCHINSON.
Corn Sheller.

No. 45,924.

3 Sheets—Sheet 3.

Patented Jan. 17, 1865.

Witnesses:

Inventor:
D. HUTCHINSON.

UNITED STATES PATENT OFFICE.

DANIEL HUTCHINSON, OF FORT ANCIENT, OHIO.

CORN-SHELLER.

Specification forming part of Letters Patent No. 45,924, dated January 17, 1865.

*To all whom it may concern:*

Be it known that I, DANIEL HUTCHINSON, of Fort Ancient, in the county of Warren, State of Ohio, have invented a new and useful Improvement in Corn-Shellers; and I do hereby declare the following to be a full, clear, and exact description thereof, reference being had to the accompanying drawings and letters marked thereon, forming part of this specification.

In my improved machine the ear of corn descends vertically between two revolving disks or plates, the inner faces of which are armed with teeth, ribs, or projections. They are carried by separate shafts, and receive motion from the same driving-wheel, as will be more fully described.

A is the main frame of the machine. B is the main driving gear-wheel, carried by a short shaft, $b$, and having its teeth or cogs $a$ facing inwardly from a rim which projects from the circumference of the wheel and forms a part thereof. $c$, is a winch, by which the machine is operated by hand, or in place thereof a pulley to receive a belt may be used. C is a metal disk carried by shaft $c'$, which also carries a small pinion, $d$, in gear with driving-wheel B. D is a metal disk carried by shaft $e$, which also carries a pinion, $f$, in gear with the main driving-wheel B.

The end of shaft $e$ is prolonged through the frame in which it is journaled, and is there pressed by a spring, $g$, which, yielding somewhat, permits the disk to be forced farther away from the face of the disk C, allowing ears of corn of any large size to pass through between them without undue strain or resistance.

E is a square channel, through which ears of corn are fed to the machine. One side of this box-shaped channel is prolonged downward, forming a breast, $h$, against which the ears press, and by which they are held in an appropriate position as they descend between the disks where the grain is shelled off.

In my machine the working-face of disk C is armed with projections or ribs $i$, arranged radially. It is not essential that these should be in the form of ribs continuous from the outer to the inner circle of the working-face. They may be made in the form of teeth or in short sections.

The working-face of disk D is armed with teeth, which operate, in conjunction with projections $h$, to remove the corn from the ear. The special function of this disk, with its slower motion than C, is to cause the ear to rotate as it enters between the disks, exposing all sides to the action of the projections $h$ on the disk C.

The disks C and D revolve in same direction, yet, as they are upon separate axes, the parts opposite between which the ears descend move relatively in opposite directions—the disk C at a high velocity, holding the ear against the breast E, and the disk D at a slower velocity, causing the ear to rotate between the two disks, as above stated.

The position in which the ear is held by the breast $h$ is such that the ribs or projections $h$ act downwardly upon the ear, causing it to descend rapidly and escape from between the disks as the grain is removed, allowing another ear to follow. The action of disk D also facilitates the passage of the ear downward.

As before stated, the spring $g$, acting against the end of shaft $e$, yields somewhat, and affords room between the disks for ears of corn of any size.

Having fully described my invention, what I claim as new therein, and desire to secure by Letters Patent of the United States, is the following:

The disks C and D and the breast $h$, when combined and arranged relatively to each other in the manner and for the purpose specified.

DANIEL HUTCHINSON.

Witnesses:
 W. H. HART,
 JOHN L. KIZAR.